(12) United States Patent
Kato et al.

(10) Patent No.: US 10,378,647 B2
(45) Date of Patent: Aug. 13, 2019

(54) SHIFT LEVER DEVICE

(71) Applicant: KABUSHIKI KAISHA TOKAI-RIKA-DENKI-SEISAKUSHO, Aichi-ken (JP)

(72) Inventors: Shori Kato, Aichi-ken (JP); Etsuo Shimizu, Aichi-ken (JP); Takayoshi Kitahara, Aichi-ken (JP); Hironori Mizuno, Aichi-ken (JP); Saburo Kato, Aichi (JP); Takaaki Fukushima, Aichi-ken (JP); Hideaki Ito, Aichi-ken (JP); Takayoshi Masuda, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 377 days.

(21) Appl. No.: 15/380,565

(22) Filed: Dec. 15, 2016

(65) Prior Publication Data
US 2017/0184195 A1    Jun. 29, 2017

(30) Foreign Application Priority Data

Dec. 25, 2015 (JP) ................. 2015-253008

(51) Int. Cl.
F16H 61/22 (2006.01)
F16H 59/02 (2006.01)
F16H 59/10 (2006.01)

(52) U.S. Cl.
CPC ......... F16H 61/22 (2013.01); F16H 59/0278 (2013.01); F16H 59/10 (2013.01); F16H 2059/0282 (2013.01)

(58) Field of Classification Search
CPC ......... F16H 59/0278; F16H 2059/0282; F16H 61/22
See application file for complete search history.

(56) References Cited

U.S. PATENT DOCUMENTS 7,360,469 B2  4/2008  Tomida
7,650,812 B2  1/2010  Tomida
(Continued)

FOREIGN PATENT DOCUMENTS

JP    2009-012624 A    1/2009
JP    2010-195398 A    9/2010

OTHER PUBLICATIONS

Extended European Search Report issued in the corresponding EP application No. 16205219.5 dated Apr. 26, 2017.

Primary Examiner — Terence Boes
(74) Attorney, Agent, or Firm — Roberts Mlotkowsi Safran Cole & Calderon P.C.

(57) ABSTRACT

A shift lever device includes: a lever main-body; a hollow knob provided at a lever main-body distal end portion; a shift-button rotatably mounted to the knob; and a rod that is inserted-through interior of the lever main-body. The shift-button has a contact surface extending in direction of being away from a rotating-shaft of the shift-button, and that, when the shift-button rotates with respect to the knob, contacts an upper end portion of the rod and lowers the rod. Given that direction orthogonal to axial-direction of the rotating-shaft on plane orthogonal to axis of the rod is reference-direction, and that, among tangent-lines at contact points of the contact surface and the rod, tangent-line on plane orthogonal to the rotating-shaft is reference tangent-line, rotation range of the shift-button is set such that, partway through rotation, the reference tangent-line passes position at which the reference tangent-line becomes parallel to the reference-direction.

2 Claims, 13 Drawing Sheets

(56) References Cited

U.S. PATENT DOCUMENTS

| | | | |
|---|---|---|---|
| 7,654,169 B2 | 2/2010 | Sumi et al. | |
| 2003/0233903 A1* | 12/2003 | Blascok | F16H 59/10 |
| | | | 74/538 |
| 2004/0103744 A1 | 6/2004 | Meyer et al. | |
| 2005/0247159 A1* | 11/2005 | Tomida | F16H 59/0278 |
| | | | 74/538 |
| 2008/0178645 A1* | 7/2008 | Howe | B60R 25/066 |
| | | | 70/201 |
| 2011/0308346 A1* | 12/2011 | Yamamura | B60K 20/04 |
| | | | 74/473.23 |
| 2017/0114892 A1* | 4/2017 | Abe | F16H 59/10 |

* cited by examiner

SHIFT LEVER DEVICE

CROSS-REFERENCE TO RELATED APPLICATION

This application claims priority under 35 USC 119 from Japanese Patent Application No. 2015-253008 filed Dec. 25, 2015, the disclosure of which is incorporated by reference herein.

BACKGROUND

Technical Field

The present invention relates to a shift lever device for operating an automatic transmission of a vehicle.

Related Art

There are shift lever devices having a shift lever that is rotated by the driver and a detent mechanism for restricting the rotation of the shift lever. At the shift lever, a shift button is mounted to a knob that the driver grasps, and the rotation restriction by the detent mechanism is canceled interlockingly with operation of the shift button. The driving mode of the automatic transmission is switched due to, in the state in which the driver operates the shift button this way, the driver rotating the shift lever and placing the shift lever at a predetermined range.

Japanese Patent Application Laid-Open (JP-A) No. 2010-195398 discloses a shift lever having a rotating-type shift button. This shift lever has a lever main body that is hollow and shaped as a shaft, a knob that is hollow and is provided at the distal end portion of the lever main body, a shift button that is rotatably mounted to the knob, and a rod that is inserted-through the interior of the lever main body. At this shift lever, due to operation of the shift button, the rod is lowered accompanying the rotating of the shift button, and the rotation restriction by the detent mechanism is cancelled.

If the rotation stroke amount of the shift button that is needed in order to obtain a given rod stroke amount is large, a large space is needed in order to permit operation of the shift button, and this leads to the shift lever becoming large. Compactness of the shift button is demanded from the standpoint of design, and, in order to satisfy this demand, it is good to be able to make the ratio of the rotation stroke amount of the shift button with respect to the rod stroke amount be small. From this standpoint, there may be room for further improvement at the shift lever device of JP-A No. 2010-195398.

SUMMARY

In view of this situation, a shift lever device is provided that is suited to making the ratio of the rotation stroke amount of a shift button and the like to the rod stroke amount be small.

An aspect of the disclosure is a shift lever device. This shift lever device includes: a lever main body that is hollow and is shaft-shaped; a knob that is hollow and is provided at a distal end portion of the lever main body; a rotating member that is disposed within the knob and is rotatably mounted to the knob; a rod that is inserted through an interior of the lever main body; and an urging member that is disposed at the interior of the lever main body, and that is configured to urge the rod toward an upper side, wherein: the rotating member has a contact surface that extends in a direction of moving away from a rotating shaft of the rotating member, and that, when the rotating member rotates with respect to the knob, contacts an upper end portion of the rod and lowers the rod, and given that a direction orthogonal to an axis of the rotating shaft on a plane orthogonal to an axis of the rod is a reference direction, and that, among tangent lines at contact points of the contact surface and the rod, a tangent line that is on a plane orthogonal to the rotating shaft is a reference tangent line, a rotation range of the rotating member is set such that the reference tangent line passes a position at which the reference tangent line becomes parallel to the reference direction partway through rotation of the rotating member.

The ratio of the amount of lowering of the rod with respect to the amount of rotation of the rotating member is greatest before and after the reference tangent line passes (at a moment the reference tangent line passes) by a position where the reference tangent line, that is at the contact point of the contact surface of the rotating member and the rod, becomes parallel to the reference direction. In accordance with this aspect, the rotation range of the rotating member is set such that the reference tangent line passes the position where the reference tangent line becomes parallel to the reference direction. Therefore, even if the rotation stroke amount of the rotating member is small, the rod stroke amount can effectively be made to be large. Accordingly, a shift lever device, that is suited to making the ratio of the rotation stroke amount of the rotating member with respect to the rod stroke amount be small, can be provided.

In the above-described aspect, there may be the shift lever device of an aspect in which a guide hole, that supports the rod such that the rod slides freely, is formed in the knob, and the contact surface is inclined with respect to the axis of the rotating shaft.

When, partway through the rotation range of the rotating member, the reference tangent line passes by the position where the reference tangent line becomes parallel to the reference direction partway therealong, the direction of the load that is applied from the rotating member to the rod reverses from one side to another side in the reference direction. In accordance with this aspect, load of a directional vector, that runs along the axis of the rotating shaft, can be applied from the rotating member to the rod. Due thereto, before and after the direction of the load that is applied from the rotating member to the rod is reversed, the rod can be moved within the guide hole from one side to the another side in the reference direction, while the rod is slid with respect to the guide hole. Accordingly, before and after the direction of the load that is applied to the rod is reversed, it is difficult for the rod to move away from the guide hole, and the generation of abnormal noise that is due to collision of the rod and the guide hole can be prevented.

The shift lever device of either of the above-described aspects may include a shift lock mechanism that is configured to provide a locking state, in which the shift lock mechanism restricts lowering of the rod, and a releasing state, in which the shift lock mechanism permits lowering of the rod, wherein the contact surface is provided such that, the reference tangent line becomes substantially parallel to the reference direction when the contact surface is at a position where the contact surface lowers the rod to a position where the lowering of the rod is restricted by the shift lock mechanism in a case in which the shift lock mechanism is in the locking state.

In accordance with this aspect, even when a large load is inputted to the rotating member in a case in which the shift lock mechanism is in the locking state, it is difficult for bending load to be applied to the rod from the contact surface of the rotating member, and it is easy to ensure the durability of the rod.

In accordance with the disclosure, a shift lever device, that is suited to making the ratio of a rotation stroke amount of a rotating member with respect to a rod stroke amount be small, can be provided.

BRIEF DESCRIPTION OF THE DRAWINGS

An exemplary embodiment will be described in detail with reference to the following figures, wherein:

FIG. 8A is a side sectional view showing a state in which the contact surface of the shift button is further toward an upper side than the reference position, FIG. 8B is a cross-sectional view showing a rod and a guide hole of FIG. 8A, FIG. 8C is a side sectional view showing a state in which the contact surface of the shift button is further toward a lower side than the reference position, and FIG. 8D is a cross-sectional view showing the rod and the guide hole of FIG. 8C.

FIG. 9A is a side sectional view showing a state in which the contact surface of the shift button is further toward the upper side than the reference position, FIG. 9B is a cross-sectional view showing the rod and the guide hole of FIG. 9A, FIG. 9C is a side sectional view showing a state in which the contact surface of the shift button is at the reference position, FIG. 9D is a cross-sectional view showing the rod and the guide hole of FIG. 9C, FIG. 9E is a side sectional view showing a state in which the contact surface of the shift button is further toward the lower side than the reference position, and FIG. 9F is a cross-sectional view showing the rod and the guide hole of FIG. 9E.

DETAILED DESCRIPTION

Figure 1:
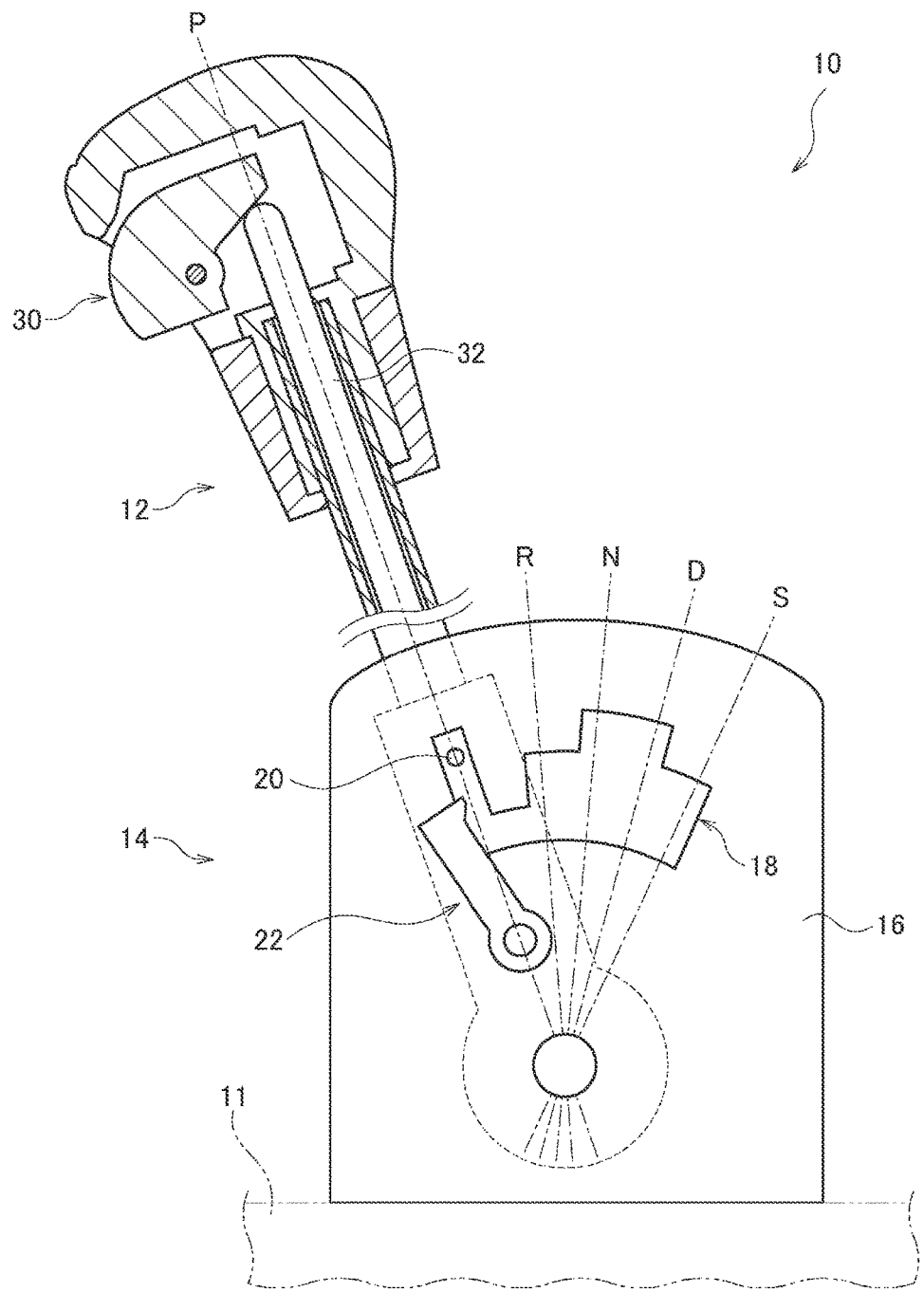
FIG. 1 is a side view showing a shift lever device of a present exemplary embodiment.

FIG. 1 is a side view showing a shift lever device 10 of the present exemplary embodiment. This drawing is also a drawing in which the shift lever device 10 is seen from the left side in the vehicle transverse direction. This drawing also shows the internal structure of a portion of a shift lever 12 of the shift lever device 10.

The shift lever device 10 of the present exemplary embodiment has the shift lever 12 that is supported so as to be rotatable with respect to a base 11. The shift lever 12 is set, for example, at a console that is positioned between a driver's seat and a front passenger's seat. The base 11 is, for example, the floor panel of the vehicle cabin.

The shift lever device 10 has a detent mechanism 14 for restricting the rotation of the shift lever 12. The detent mechanism 14 has a detent plate 16 that is disposed at the side of the locus of rotation of the shift lever 12, a detent window (opening) 18 that is formed in the detent plate 16, and a detent pin 20 of the shift lever 12 that is inserted-through the detent window 18.

The detent plate 16 is fixed with respect to the base. Due to the detent window 18 engaging with the detent pin 20 of the shift lever 12, the shift lever 12 is positioned at any range (shift position) among plural ranges (shift positions). The plural ranges include a parking range (P range (shift position)), a reverse range (R range (shift position)), a neutral range (N range (shift position)), a drive range (D range (shift position)), and a second range (S range (shift position)). These ranges are disposed in that order from the front side toward the rear side of the vehicle.

Figure 2:
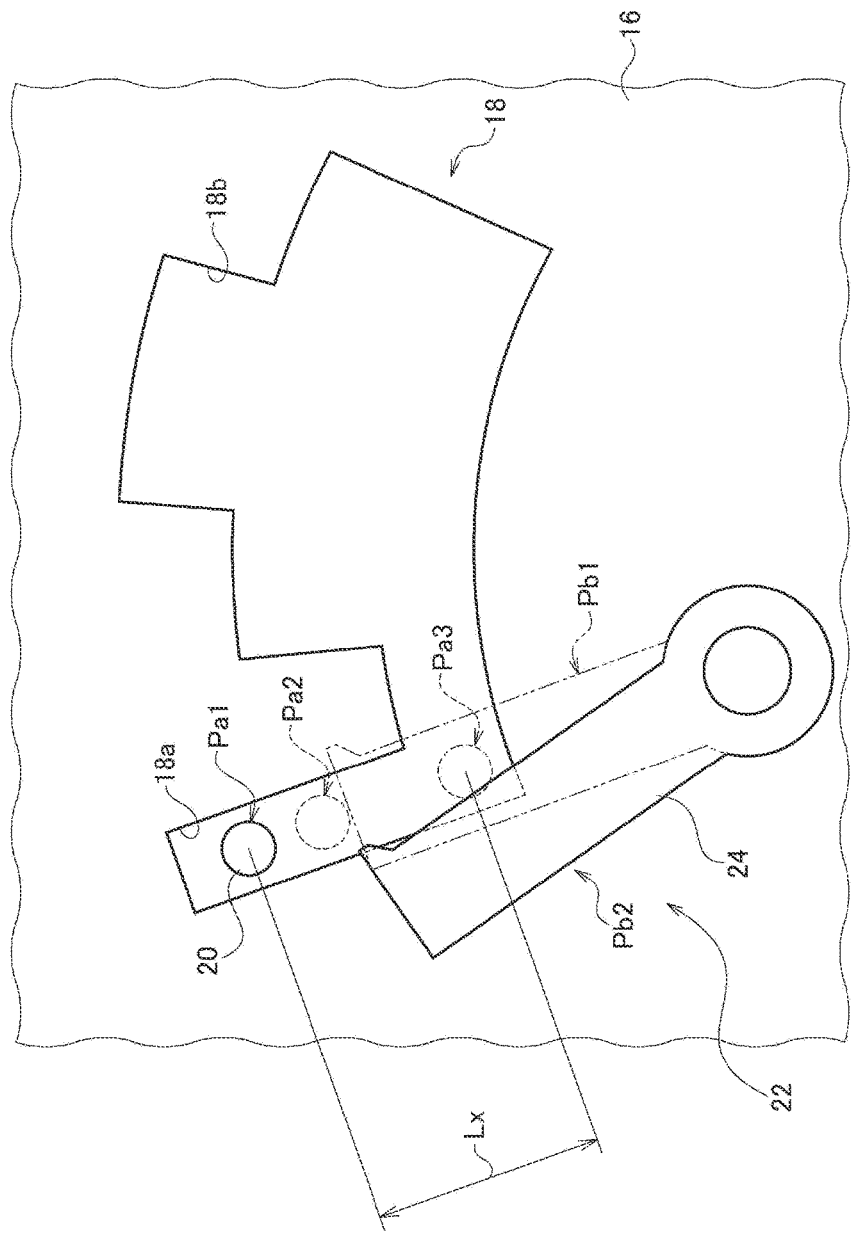
FIG. 2 is an enlarged view of a detent window of FIG. 1.

FIG. 2 is an enlarged view of the detent window 18 of FIG. 1.

As shown in FIG. 1 and FIG. 2, a first detent groove portion 18a for positioning the shift lever 12 at the non-traveling range (shift position) (the P range), and a second detent groove portion 18b for positioning the shift lever 12 at the traveling ranges (shift positions) (the R range, the N range, the D range and the S range), are formed at the detent window 18. The detent pin 20 can move between restricting positions Pa1, Pa2 at which the detent pin 20 restricts rotation of the shift lever 12 by engaging with the respective detent groove portions 18a, 18b, and a permitting position Pa3 at which the detent pin 20 is gone out from the detent groove portions 18a, 18b and permits rotation of the shift lever 12. The detent pin 20 can move from the restricting positions Pa1, Pa2 to the permitting position Pa3 due to the detent pin 20 being lowered together with a rod 32 of the shift lever 12 interlockingly with operation of a shift button 30 (to be described later) of the shift lever 12.

The shift lever device 10 further has a shift lock mechanism 22 for locking shifting (shift-operation) of the shift lever 12. The shift lock mechanism 22 has a stopper 24 for restricting the lowering of the detent pin 20. The stopper 24 is supported so as to be rotatable with respect to the detent plate 16. The stopper 24 can move between a locking position Pb1, at which, due to the stopper 24 engaging with the detent pin 20, the stopper 24 restricts movement of the detent pin 20 from the restricting positions Pa1, Pa2 to the permitting position Pa3, and a releasing position Pb2 at which the stopper 24 permits movement of the detent pin 20 from the restricting positions Pa1, Pa2 to the permitting position Pa3. The stopper 24 is held at the locking position Pb1 or at the releasing position Pb2 due to a combination of an electromagnetic solenoid and a metal plate that are not shown in the drawings, or by engaging with another member that is not shown in the drawings. The stopper 24 can move between the locking position Pb1 and the releasing position Pb2 due to the electromagnetic solenoid being controlled by an electronic control device.

In this way, the shift lock mechanism 22 can assume a locking state, in which the shift lock mechanism 22 restricts movement of the detent pin 20 from the restricting positions Pa1, Pa2 to the permitting position Pa3, and a releasing state, in which the shift lock mechanism 22 permits movement of the detent pin 20 from the restricting positions Pa1, Pa2 to the permitting position Pa3. From another standpoint, it can be said that the shift lock mechanism 22 can assume a locking state, in which the shift lock mechanism 22 restricts lowering of the rod 32 and the detent pin 20 of the shift lever 12, and a releasing state in which the shift lock mechanism 22 permits lowering of the rod 32 and the detent pin 20.

Figure 3:
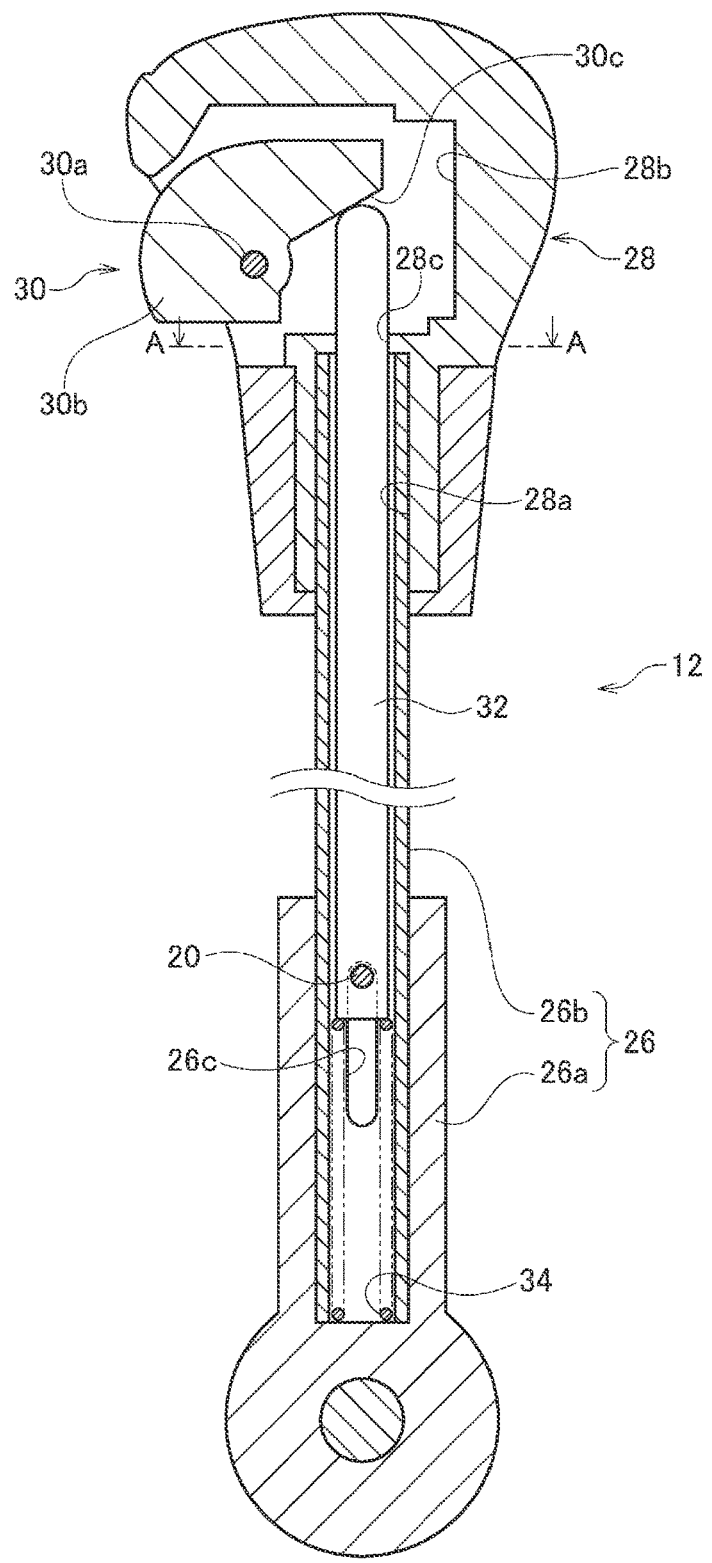
FIG. 3 is a side sectional view of a shift lever of the present exemplary embodiment.

FIG. 3 is a side sectional view of the shift lever 12.

The shift lever 12 has a lever main body 26 that is hollow and is shaped as a shaft. The lower end portion of the lever main body 26 is rotatably mounted to a base. The interior of the lever main body 26 is formed such that the distal end side of the lever main body 26 is open, and the base end side of the lever main body 26 has a bottomed shape.

The lever main body 26 has a first sleeve 26*a* that is provided at the lower portion of the lever main body 26, and a second sleeve 26*b* that is provided at the upper portion of the lever main body 26 and that is inserted in the first sleeve 26*a*. The second sleeve 26*b* is mounted by a screw or the like to the first sleeve 26*a*.

The shift lever 12 further has a knob 28 that is hollow and that is provided at the distal end portion of the lever main body 26, the shift button 30 that is disposed within the knob 28, and the rod 32 that is inserted-through the lever main body 26 interior.

The knob 28 is a handle portion that the driver grasps, and is formed in a solid-cylindrical shape overall. An insertion hole 28*a*, into which the distal end portion of the lever main body 26 is inserted, is formed in the lower portion of the knob 28. The knob 28 is mounted to the distal end portion of the lever main body 26 by a screw or the like. An accommodating hole 28*b* is formed in the upper portion of the knob 28, and the shift button 30 is disposed (accommodated) within the accommodating hole 28*b*. The accommodating hole 28*b* opens at a side surface of the knob 28.

Figure 4:
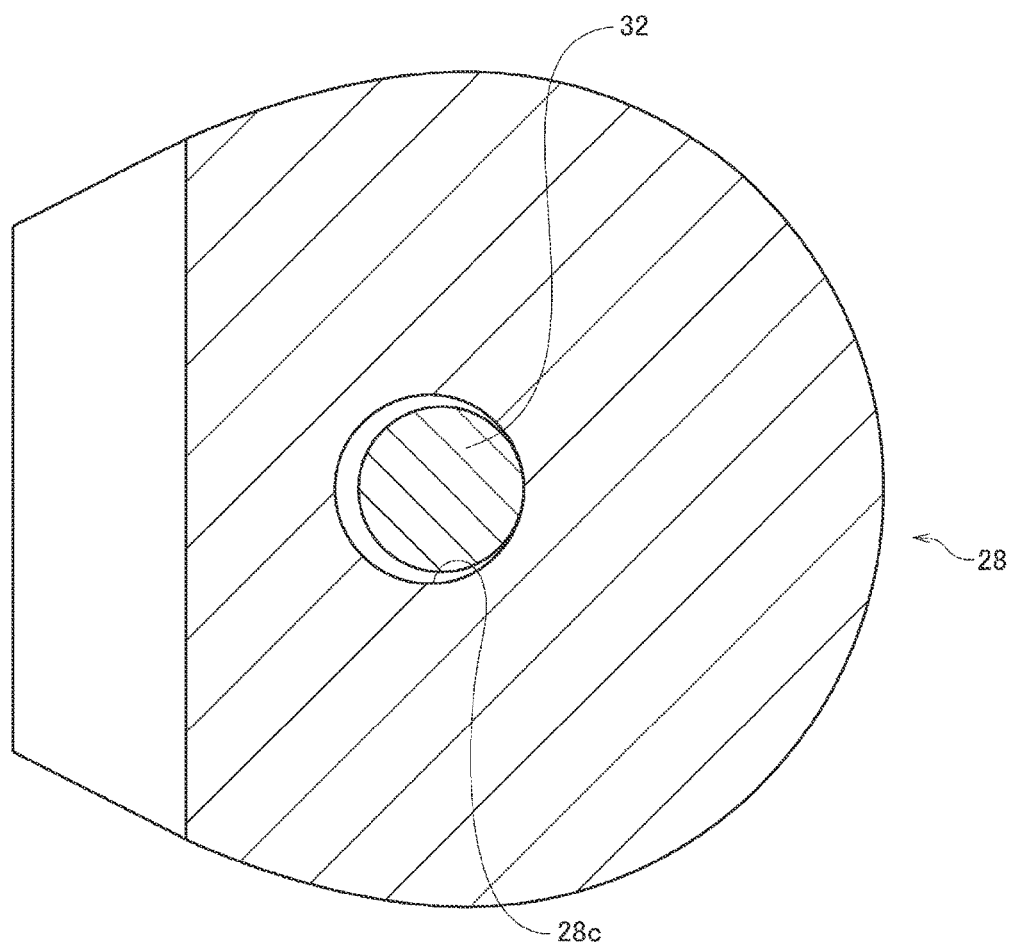
FIG. 4 is a cross-sectional view along line A-A of FIG. 3.

FIG. 4 is a cross-sectional view along line A-A of FIG. 3.

As shown in FIGS. 3 and 4, a guide hole 28*c* is formed in the knob 28 between the insertion hole 28*a* and the accommodating hole 28*b*. The upper end portion of the rod 32, that projects-out from the distal end portion of the lever main body 26, is inserted-through the guide hole 28*c*. The guide hole 28*c* of the present exemplary embodiment is formed in a circular shape. The upper end portion of the rod 32 projects-out from the guide hole 28*c* into the accommodating hole 28*b* interior. The guide hole 28*c* supports the rod 32 such that the rod 32 slides freely when the rod 32 is raised and lowered, i.e., when the rod 32 is moved reciprocally toward both sides in the axial direction.

In FIG. 3, the shift button 30 is a rotating member that is rotatably mounted to the knob 28 via a rotating shaft 30*a*. The shift button 30 is operated in order to make shifting (shift-operating) of the shift lever 12 possible.

The shift button 30 has an operated portion 30*b* that is exposed to the exterior of the knob 28 from the accommodating hole 28*b*, and a contact surface 30*c* that extends in a direction of going away from the rotating shaft 30*a*. The operated portion 30*b* is the portion that is subjected to operation from the driver. The driver operates the shift button 30 by pushing the operated portion 30*b* so as to push the operated portion 30*b* upward. The contact surface 30*c* of the present exemplary embodiment is formed flat so as to extend in a direction orthogonal to the rotating shaft 30*a* of the shift button 30. When the driver pushes the operated portion 30*b* of the shift button 30 so as to push the operated portion 30*b* up, the shift button 30 rotates around the rotating shaft 30*a* with respect to the knob 28. At this time, the contact surface 30*c* of the shift button 30 contacts the upper end portion of the rod 32 and lowers the rod 32.

The rod 32 can move along the length (longitudinal) direction of the lever main body 26. The rod 32 is formed in a solid cylindrical shape, and the upper end portion thereof is formed in the shape of a spherical surface. The above-described detent pin 20, that projects-out toward the radial direction outer sides of the rod 32, is provided at the lower end portion of the rod 32. The detent pin 20 projects-out toward the sides in opposite directions, sandwiching the central axis of the rod 32. Slit holes 26*c*, through which the both end portions of the detent pin 20 are inserted, are formed in the lever main body 26. The slit holes 26*c* are formed so as to extend along the length direction of the lever main body 26 in order to permit movement of the rod 32.

The shift lever device 10 further has an urging member 34 that is disposed within the lever main body 26. The urging member 34 is disposed between the inner bottom portion of the lever main body 26 and the lower end portion of the rod 32. The urging member 34 of the present exemplary embodiment is a coil spring, and can urge the rod 32 toward the upper side. When the shift button 30 is operated, the rod 32 is lowered against the urging force of the urging member 34. When operation of the shift button 30 is released, the rod 32 is raised by the urging force of the urging member 34.

Figure 5A:
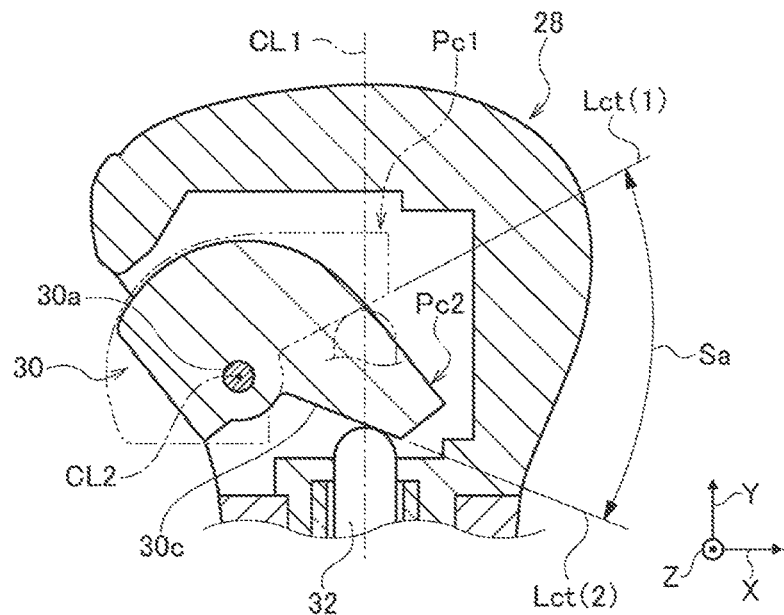
FIG. 5A is a drawing showing a rotation range of a shift button of the present exemplary embodiment.
Figure 5B:
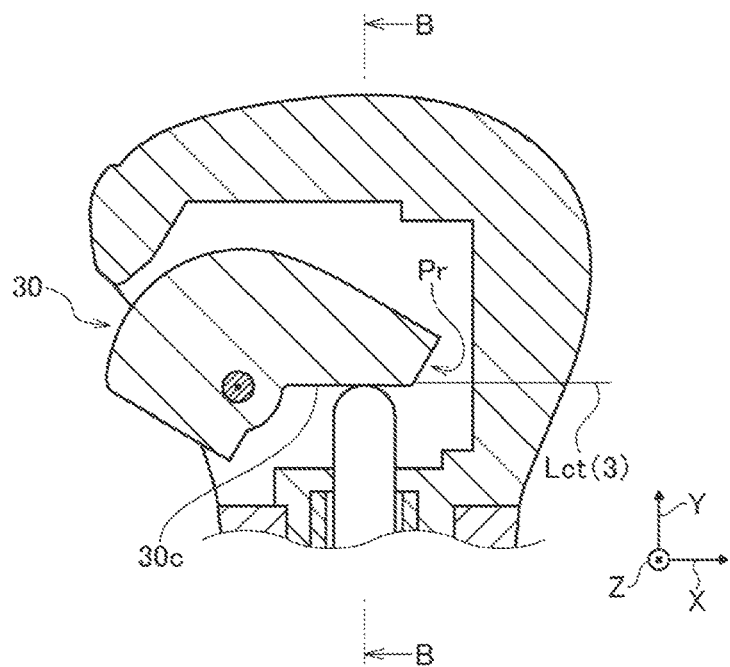
FIG. 5B is a drawing showing a state in which the shift button is at a reference position.

FIG. 5A is a drawing showing a rotation range Sa of the shift button 30, and FIG. 5B is a drawing showing a state in which the contact surface 30*c* of the shift button 30 is at a reference position Pr (to be described later).

The direction that runs along axis CL1 of the rod 32 is called rod axis direction Y, and the direction that runs along axis CL2 of the rotating shaft 30*a* of the shift button 30 is called rotation axis direction Z. The rod axis direction Y is also the direction that runs along the axis of the guide hole 28*c*. Further, the direction, that is orthogonal to the rotation axis direction Z in a plane orthogonal to the axis CL1 of the rod 32, is reference direction X.

Further, among the tangent lines at the contact points of the contact surface 30*c* of the shift button 30 and the rod 32, the tangent lines that exists in the plane (the plane parallel to the surface of the drawings that are FIGS. 5A and FIG. 5B) orthogonal to the rotating shaft 30*a* of the shift button 30 are reference tangent line Lct of the shift button 30. It can be also said that this reference tangent lines Lct are the straight lines that are on the plane orthogonal to the rotating shaft 30*a* of the shift button 30, among the straight lines that are on the tangent planes that pass through the contact points of the contact surface 30*c* of the shift button 30 and the rod 32. FIG. 5A shows reference tangent line Lct(1) which is the line when the shift button 30 is at initial position Pc1, and reference tangent line Lct(2) which is the line when the shift button 30 is at a partway rotated position Pc2. The initial position Pc1 here means the position that the shift button 30 is at when the shift button 30 is in a non-operated state. This reference tangent line Lct is used as a concept that is an index for illustrating the rotational position of the shift button 30 in the plane (the surface of the drawings that are FIGS. 5A and 5B) orthogonal to the rotating shaft 30*a* of the shift button 30.

At this time, as shown in FIG. 5B, the rotation range Sa of the shift button 30 is set such that, partway through rotation of the shift button 30 (for example, partway through rotation of the shift button 30 from the initial position of the shift button 30 to a final position of the shift button 30, which is at opposite to the initial position in the rotating direction and at which further rotating of the shift button 30 is impossible), the reference tangent line Lct (the contact surface 30*c* of the shift button 30) passes (passes over) the position at which the reference tangent line Lct of the shift button 30 becomes parallel to the reference direction X (hereinafter, this position is called the reference position Pr).

In other words, the contact surface 30c is set (formed) such that the contact surface 30c is configured to be (can be) at a position at which position the reference tangent line Lct of the shift button 30 becomes parallel to the reference direction X during the shift button 30 is rotated from the initial position of the shift button 30 to the final position of the shift button 30 of the rotation range thereof.

Hereinafter, the reference tangent line Lct at the reference position Pr is called Lct(3). From another standpoint, the rotation range Sa of the shift button 30 is set to be a range that is such that, partway through rotation of the shift button 30, the contact surface 30c of the shift button 30 is across over (passes over) the reference position Pr in the rod axis direction Y. The reason for this is described hereinafter.

Figure 6A:
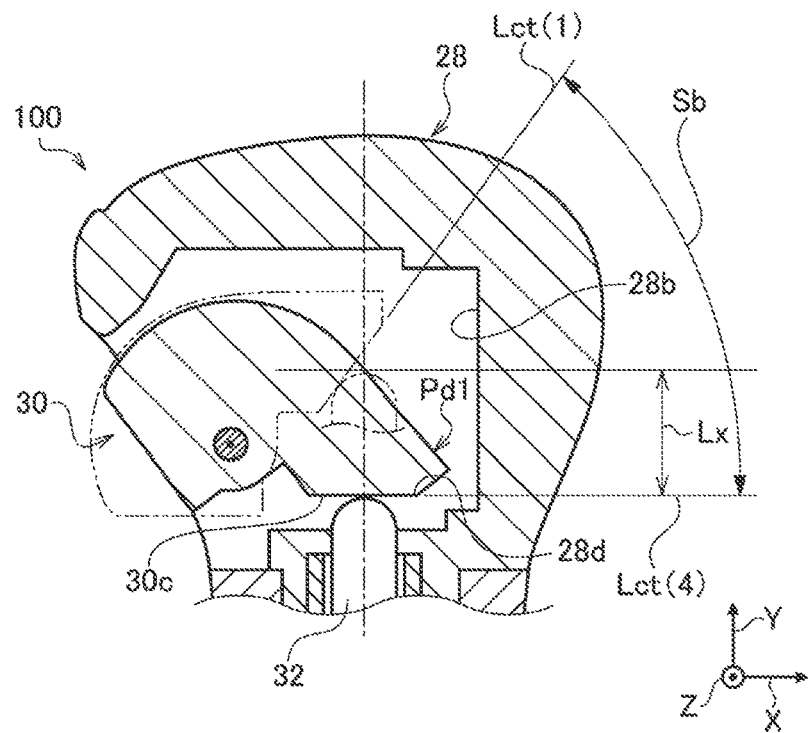
FIG. 6A is a drawing showing a shift lever device of a reference example.

FIG. 6A is a drawing showing shift lever device 100 of a reference example. The shift lever device 100 of the reference example differs from the shift lever device 10 of the present embodiment with regard to the point that the rotation range Sb of the shift button 30 is set such that, in partway through rotation, the reference tangent line Lct of the shift button 30 does not pass (does not pass over) the reference position Pr (refer to FIG. 6B). (For example, in FIG. 6A, a reference tangent line Lct(4) which is described later is positioned slightly upper side that the reference position Pr.) In order to set the rotation range Sb in this way, an engaging portion 28d, that is for prescribing a final end position Pd1 of rotation range Sb of the shift button 30 by engaging with the contact surface 30c of the shift button 30, is provided within the accommodating hole 28b of the knob 28. This drawing shows the reference tangent line Lct(4) at the time when the shift button 30 is at the final end position Pd1. In this case, in order to make the stroke amount of the rod be a constant amount Lx, it is necessary that rotation angle θ of the shift button 30 is made to be 54° (54 degrees). Note that this rod stroke amount Lx corresponds to the amount of movement of the rod 32 from the initial position that is needed in order to move the detent pin 20 of the shift lever 12 from the restricting position Pa1 to the permitting position Pa3 (see FIG. 2).

Figure 6B:
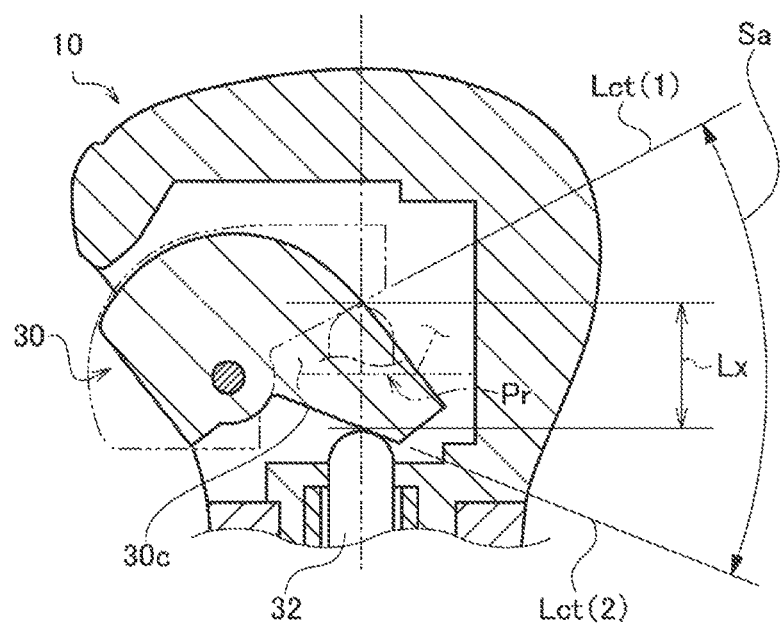
FIG. 6B is a drawing showing the shift lever device of the present exemplary embodiment.

FIG. 6B is a drawing showing the shift lever device 10 of the present exemplary embodiment.

At the shift lever device 10 of the present exemplary embodiment, the rotation range Sa of the shift button 30 is set such that, in partway through rotation, the reference tangent line Lct of the shift button 30 passes the reference position Pr. Due thereto, in the shift lever device 10 of the present exemplary embodiment, the rotation angle of the shift button 30 that is needed in order to make the rod stroke amount be the constant amount Lx can be made to be small.

In this way, if the rotation range of the shift button 30 is set such that the reference tangent line Lct of the shift button 30 passes the reference position Pr, the rod stroke amount can effectively be made to be large even though the rotation stroke amount of the shift button 30 is small. This is caused from that the ratio of the amount of lowering (moving) of the rod 32 with respect to the rotation amount of the shift button 30 is greatest when before and after (at a moment when) the reference tangent line Lct of the shift button 30 passes the reference position Pr. Accordingly, the shift lever device 10, that is suited to making the rotation stroke amount of the shift button small, can be provided in accordance with the present exemplary embodiment.

Figure 7:
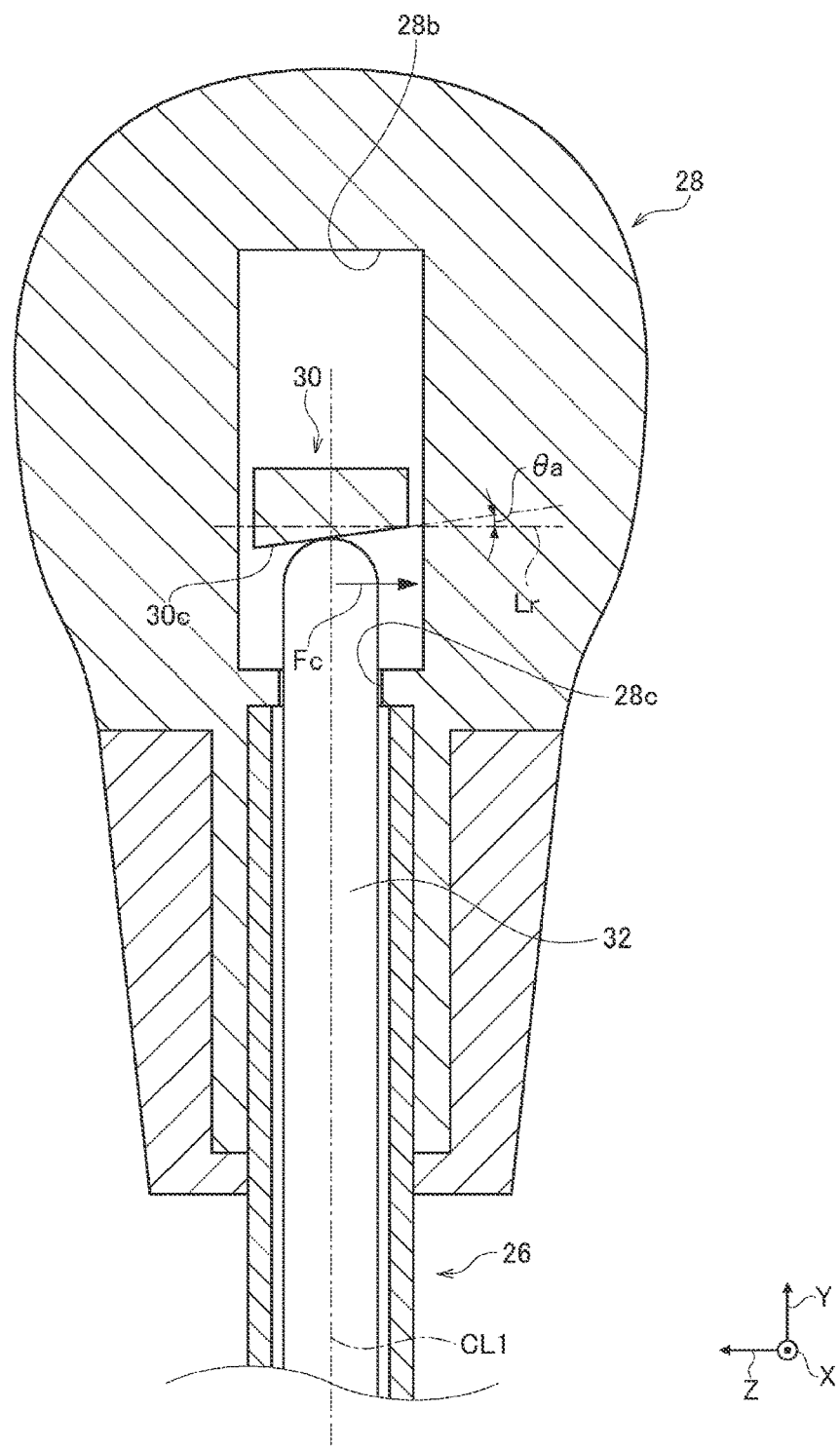
FIG. 7 is a cross-sectional view along line B-B of FIG. 5B.

Other features of the shift lever device 10 of the present exemplary embodiment are described next. FIG. 7 is a cross-sectional view along line B-B of FIG. 5B. The contact surface 30c of the shift button 30 is inclined with respect to the axis CL2 (see FIG. 5A) of the rotating shaft 30a of the shift button 30. This means that, when views along the rotation direction of the shift lever 12 (the direction of the reference axis X), given that an imaginary line, that passes the contact surface 30c (an edge of the contact surface 30c in FIG. 7) of the shift button 30 and that is parallel to the axis CL2 of the rotating shaft 30a of the shift button 30, is the reference line Lr, the contact surface 30c of the shift button 30 is inclined with respect to the reference line Lr. The reason for this is described hereinafter.

There may be a case that abnormal noise may arise due to contact between the guide hole 28c of the knob 28 and the rod 32.

Figure 8A:
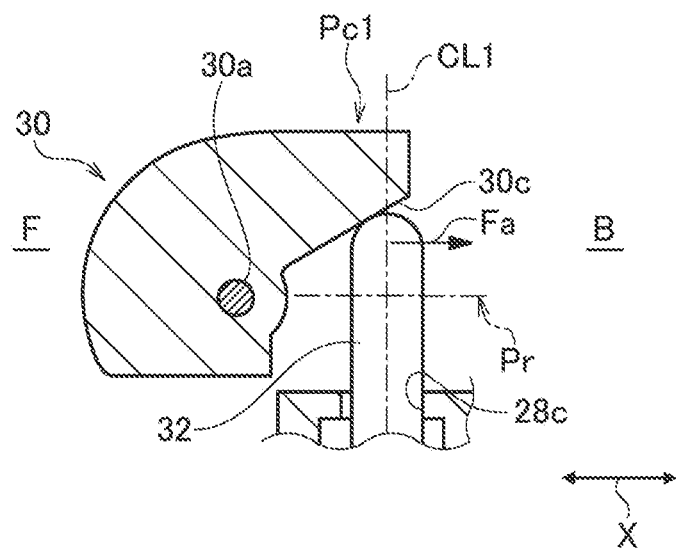
FIGS. 8A through 8D are drawings for explaining operation at a time when angle θa of a contact surface of the shift button is 0°, where
Figure 8B:
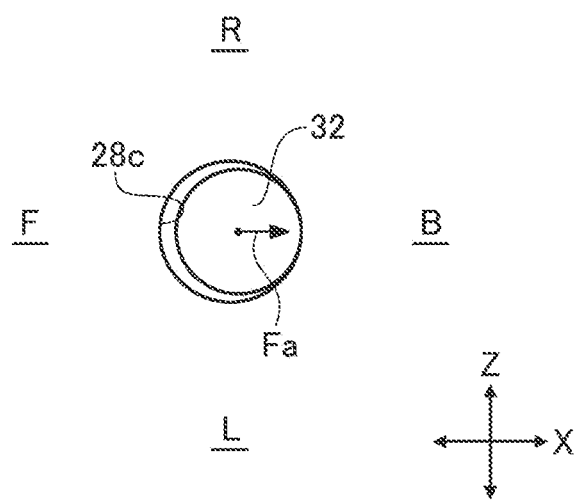

First, as shown in FIGS. 8A and 8B, a case is considered in which the shift button 30 starts to be rotated in one direction (hereinafter called the pushing-in direction) from the initial position Pc1. FIG. 8B is a cross-sectional view in which the guide hole 28c of the knob 28 is seen from the same viewpoint as in FIG. 4.

Here, given that angle θa (see FIG. 7) of the contact surface 30c of the shift button 30 with respect to the reference line Lr is 0°. Hereinafter, for convenience of explanation, of the both sides in the reference direction X, the side that is far from the rotating shaft 30a (the right side in FIGS. 8A and 8B) is vehicle rear side B, and the side that is near to the rotating shaft 30a (the left side in FIGS. 8A and 8B) is vehicle front side F. Further, of the both sides in the rotation axis direction Z, the far (deeper) side in FIG. 8A (the upper side in FIG. 8B) is vehicle right side R, and the near side in FIG. 8A (the lower side in FIG. 8B) is vehicle left side L.

In this case, the contact surface 30c of the shift button 30 is further toward the upper side than the reference position Pr, and contacts the upper end portion of the rod 32 at a position at the side near to the rotating shaft 30a (the vehicle front side F) with respect to the axis CL1 of the rod 32. In this state, when the shift button 30 is rotated in the pushing-in direction, load Fa is applied from the shift button 30 to the rod 32 toward the side of moving away from the rotating shaft 30a (toward the vehicle rear side B).

Figure 8C:
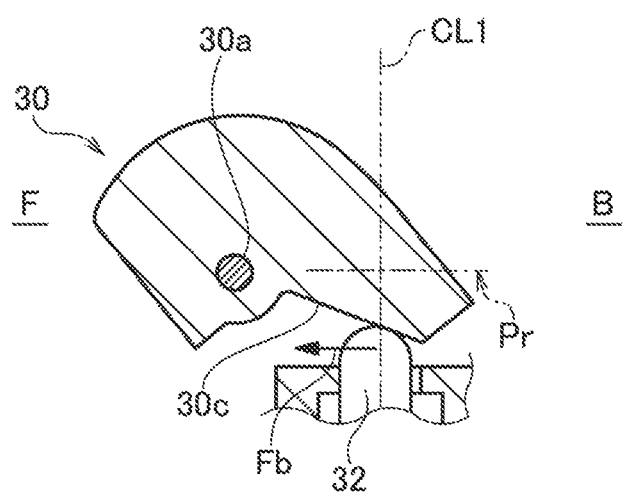
Figure 8D:
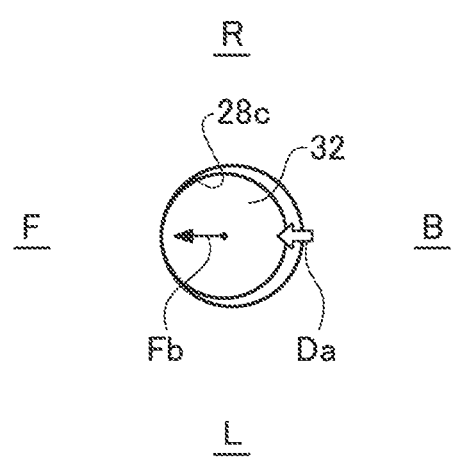

Thereafter, as shown in FIGS. 8C and 8D, a case is considered in which the shift button 30 is rotated in the pushing-in direction until the contact surface 30c of the shift button 30 goes past the reference position Pr toward the lower side. In this case, the contact surface 30c of the shift button 30 contacts the upper portion of the rod 32 at a position that is at the side far from the rotating shaft 30a (the vehicle rear side B) with respect to the axis CL1 of the rod 32. In this state, when the shift button 30 is rotated in the pushing-in direction, load Fb is applied from the shift button 30 to the rod 32 toward the side of approaching the rotating shaft 30a (toward the vehicle front side F).

Namely, in a case in which the shift button 30 (the contact surface 30c) passes by the reference position Pr partway through rotation through the rotation range, the direction of the load that is applied from the shift button 30 to the rod 32 is reversed. The direction of the load is reversed from one side (the vehicle rear side B) to another side (the vehicle front side F) in the reference direction X. At the time when the direction of the load that is applied to the rod 32 is reversed, as shown in FIG. 8D, there may be a case in which the rod 32 moves away from the guide hole 28c of the knob 28 and moves in direction Da, and thereafter, collides forcefully with the guide hole 28c. This becomes a cause of abnormal noise.

As a countermeasure thereto, as shown in FIG. 7, the contact surface 30c of the shift button 30 of the present exemplary embodiment is inclined with respect to the axis CL2 of the rotating shaft 30a (the reference line Lr). Due thereto, in addition to the loads Fa, Fb of vectors in the directions of approaching and moving away from the rotating shaft 30a (the reference direction X), the contact surface 30c of the shift button 30 can also apply, to the rod 32, load Fc (see FIGS. 9B, 9D, 9F) of a vector in the rotation axis direction Z that runs along axis CL2 of the rotating shaft 30a.

Figure 9A:
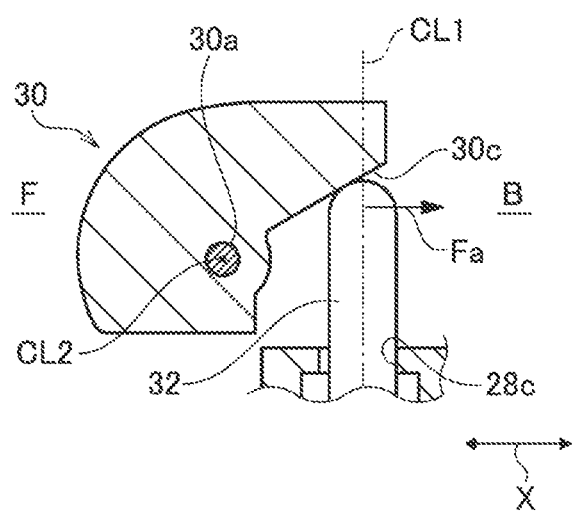
FIGS. 9A through 9F are drawings for explaining operation at a time when the angle θa of the contact surface of the shift button is greater than or equal to 0°, where
Figure 9B:
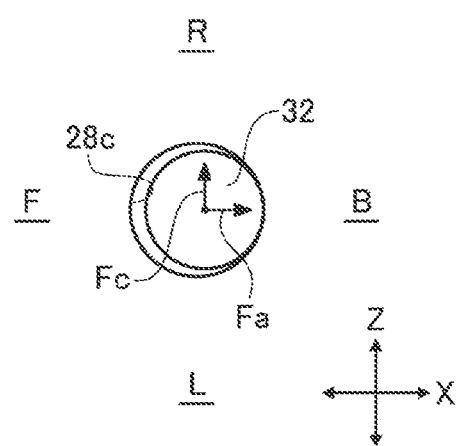

FIGS. 9A and 9B show a state in which the contact surface 30c of the shift button 30 is further toward the upper side than the reference position Pr. In this case, the load Fa of a vector that is directed toward the side far from the rotating shaft 30a (toward the vehicle rear side B), and the load Fc of a vector that is directed toward one side in the rotation axis direction Z (toward the vehicle right side R), are applied from the shift button 30 to the rod 32.

Figure 9C:
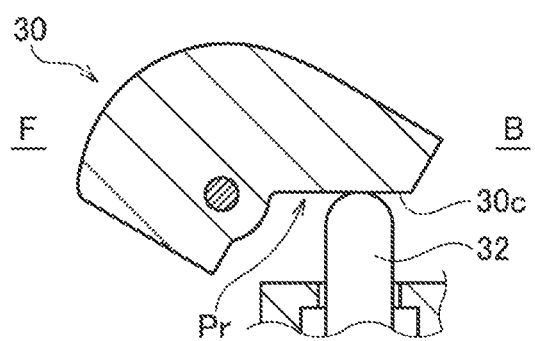
Figure 9D:
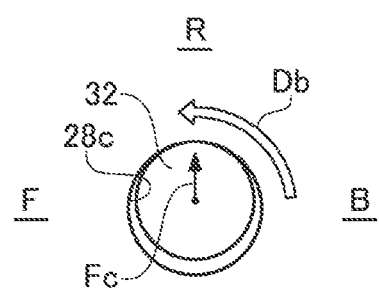

FIGS. 9C and 9D show a state in which the contact surface 30c of the shift button 30 is at the reference position Pr. As the contact surface 30c of the shift button 30 approaches the reference position Pr, the load Fa in the reference direction X that is applied from the shift button 30 to the rod 32 gradually weakens, and, on the other hand, the load Fc in the rotation axis direction Z continues to be applied. Accordingly, as the contact surface 30c of the shift button 30 approaches the reference position Pr, the rod 32 remains in a state of being made to contact the guide hole 28c, and the rod 32 can be slid (refer to direction Db) from the side away from the rotating shaft 30a (the vehicle rear side B) toward one side in the rotation axis direction Z (the vehicle right side R).

Figure 9E:
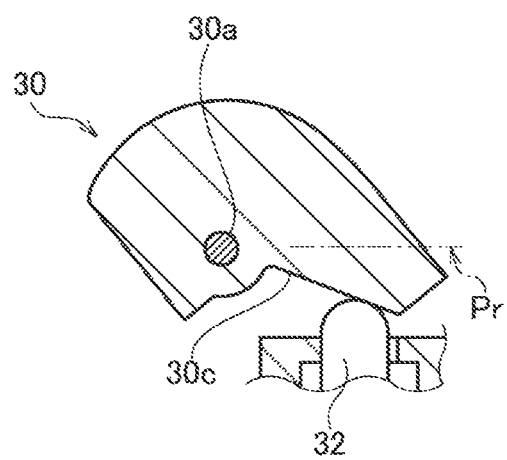
Figure 9F:
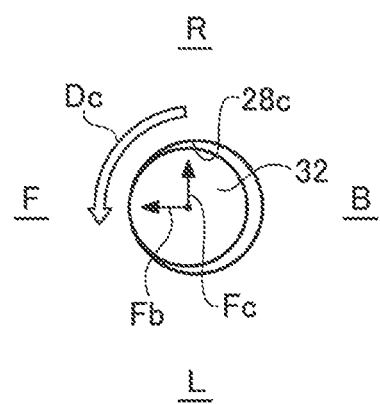

FIGS. 9E and 9F show a state in which the contact surface 30c of the shift button 30 is further toward the lower side than the reference position Pr. In this case, the load Fb of a vector that is directed toward the side near the rotating shaft 30a (toward the vehicle front side F), and the load Fc of a vector that is directed toward one side in the rotation axis direction Z of the shift button 30 (the vehicle right side R), are applied from the shift button 30 to the rod 32. As the contact surface 30c of the shift button 30 moves away from the reference position Pr, the load Fb that is applied from the shift button 30 to the rod 32 gradually strengthens. Accordingly, as the contact surface 30c of the shift button 30 moves away from the reference position Pr, the rod 32 remains in a state of being made to contact the guide hole 28c, and the rod 32 can be slid (refer to direction Dc) from one side in the rotation axis direction Z (the vehicle right side R) toward the side near the rotating shaft 30a (the vehicle front side F).

As a result, when before and after the direction of the load that is applied from the shift button 30 to the rod 32 is reversed from one direction to the another direction, the rod 32 can be made to move within the guide hole 28c from one side toward the another side in the reference direction X, while the rod 32 is slid with respect to the guide hole 28c. Accordingly, when before and after the direction of the load that is applied to the rod 32 is reversed, it is difficult for the rod 32 to move apart from the guide hole 28c, and the generation of abnormal noise that is due to collision between the rod 32 and the guide hole 28c can be prevented.

The shift lever 12 also has the following characteristic points.

As shown in FIG. 2, when the stopper 24 of the shift lock mechanism 22 is at the locking position Pb1 and the shift lock mechanism 22 is in the locking state, lowering of the detent pin 20 and the rod 32 of the shift lever 12 is restricted. At this time, the detent pin 20 and the rod 32 of the shift lever 12 can move in a range from the first restricting position Pa1, at which it is disposed when the shift button 30 is at the initial position Pc1, to the second restricting position Pa2 at which lowering is restricted by the shift lock mechanism 22 that is in the locking state.

Figure 10:
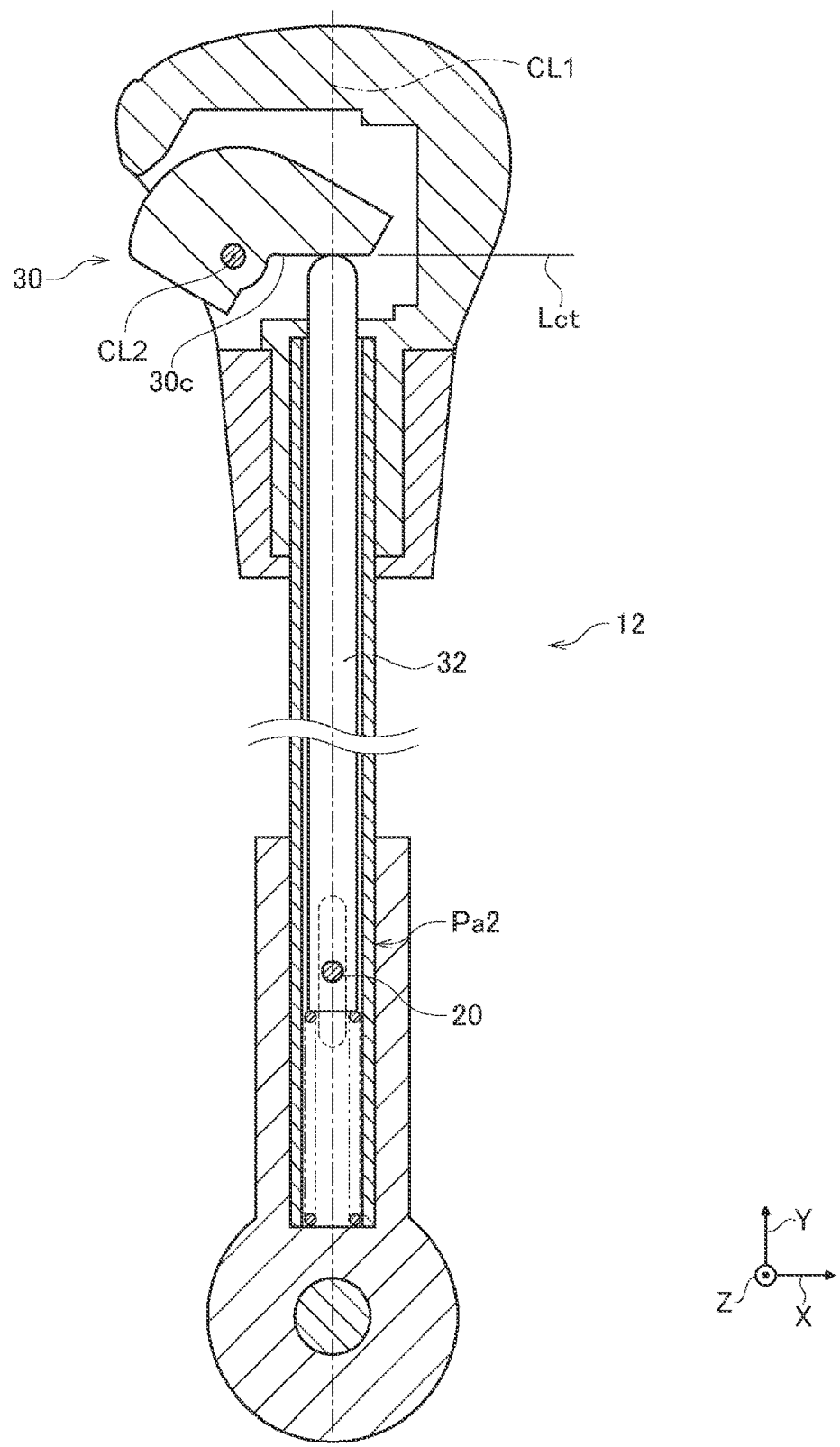
FIG. 10 is a side sectional view showing a state in which the rod is at a position at which lowering is restricted by a shift lock mechanism that is in a locking state.

FIG. 10 shows the state at the time when the detent pin 20 and the rod 32 of the shift lever 12 are at the second restricting position Pa2.

In this way, the contact surface 30c of the shift button 30 is provided such that the reference tangent line Lct becomes substantially parallel to the above-described reference direction X when the contact surface 30c is at a position where the contact surface has lowered the rod 32 to a position at which lowering of the rod 32 is restricted by the shift lock mechanism 22 in a case in which the shift lock mechanism 22 is in the locking state.

Namely, the shift button 30 is arranged such that, when the contact surface 30c of the shift button 30 contacts the rod 32 which is in a state in which lowering movement of the rod 32 is restricted by the shift lock mechanism 22 when the shift lock mechanism 22 is in the locking state, the reference tangent line Lct becomes substantially parallel to the above-described reference direction X.

"Substantially" here includes both a case in which the reference tangent line Lct is completely parallel to the reference direction X, and a case in which the reference tangent line Lct is approximately parallel to the reference direction X.

Generally, at the shift lever device 10, for the rod 32, sufficient durability is required so that the rod 32 can withstand even a case in which a large load is inputted to the shift button 30 due to mischief or the like in a case in which the shift lock mechanism 22 is in the locking state. Here, in accordance with the above-described structure, in a case in which the shift lock mechanism 22 is in the locking state, even when a large load is inputted to the shift button 30, it is difficult for bending load to be applied to the rod 32 from the contact surface 30c of the shift button 30, and deformation due to such a bending load can be prevented. Accordingly, even when a large load is inputted to the shift button 30, it is easy to ensure the durability of the rod 32.

The exemplary embodiment has been described above on the basis of an embodiment. However, the embodiment is merely an example, and it can be understood by those skilled in the art that various modifications of the respective structural elements and combinations of respective processes are possible, and that such modifications also are included within the scope of the present invention.

An example has been described in which, at the shift button 30, the operated portion 30b that is subjected to operation from the driver, and the contact surface 30c that contacts the upper end portion of the rod 32, are provided at a single member. Other than this, the operated portion 30b and the contact surface 30c of the shift button 30 may be provided at separate members. In this case, it suffices for the contact surface 30c of the shift button 30 to be provided at a rotating member that is rotatably mounted to the knob 28.

An example has been described in which the contact surface 30c of the shift button 30 is formed to be flat so as to extend in a direction orthogonal to the rotating shaft 30a of the shift button 30, but, other than this, the contact surface 30c may be formed so as to be curved. In this case as well, it suffices for the rotation range Sa of the shift button 30 to be set such that, partway through rotation, the reference tangent line Lct passes by the position at which the reference tangent line Lct becomes parallel to the reference direction X.

Further, it suffices for the shift lock mechanism 22 to have a structure that can assume the locking state, at which the shift lock mechanism 22 restricts lowering of the rod 32, and a lock releasing state at which the shift lock mechanism 22 permits lower of the rod 32, and the concrete structure of the shift lock mechanism 22 is not limited to the example of the embodiment.

What is claimed is:

1. A shift lever device comprising:
a lever main body that is hollow and is shaft-shaped;
a knob that is hollow and is provided at a distal end portion of the lever main body;
a rotating member that is disposed within the knob and is rotatably mounted to the knob;
a rod that is inserted through an interior of the lever main body; and
an urging member that is disposed at the interior of the lever main body, and that is configured to urge the rod toward an upper side,
wherein:
the rotating member has a contact surface that extends in a direction of moving away from a rotating shaft of the rotating member, and that, when the rotating member rotates with respect to the knob, contacts an upper end portion of the rod and lowers the rod, and
given that a direction orthogonal to an axis of the rotating shaft on a plane orthogonal to an axis of the rod is a reference direction, and that, among tangent lines at contact points of the contact surface and the rod, a tangent line that is on a plane orthogonal to the rotating shaft is a reference tangent line, a rotation range of the rotating member is set such that the reference tangent line passes a position at which the reference tangent line becomes parallel to the reference direction partway through rotation of the rotating member,
the shift lever device further comprising:
a shift lock mechanism that is configured to provide a locking state, in which the shift lock mechanism restricts lowering of the rod, and a releasing state, in which the shift lock mechanism permits lowering of the rod,
wherein the contact surface is provided such that, the reference tangent line becomes substantially parallel to the reference direction when the contact surface is at a position where the contact surface lowers the rod to a position where the lowering of the rod is restricted by the shift lock mechanism in a case in which the shift lock mechanism is in the locking state.

2. The shift lever device of claim 1, wherein
a guide hole, that supports the rod such that the rod slides freely, is formed in the knob, and
the contact surface is inclined with respect to the axis of the rotating shaft.

\* \* \* \* \*